United States Patent [19]

Becker

[11] Patent Number: 4,795,585

[45] Date of Patent: Jan. 3, 1989

[54] POLYVINYL ALCOHOL CONTAINING POLYALUMINUM CHLORIDE FLOCCULANTS

[75] Inventor: Larry W. Becker, Marcellus, N.Y.

[73] Assignee: General Chemical Corporation, Morristown, N.J.

[21] Appl. No.: 42,439

[22] Filed: Apr. 24, 1987

[51] Int. Cl.$^4$ ............................................. C02F 5/10
[52] U.S. Cl. .................................... 252/181; 210/702; 210/716; 210/723; 252/175; 423/462; 423/629; 524/437; 524/557
[58] Field of Search ................ 252/175, 181; 210/702, 210/716, 723; 524/437, 557; 423/462, 629

[56] References Cited

U.S. PATENT DOCUMENTS

| | | | |
|---|---|---|---|
| Re. 28,807 | 5/1976 | Panzer et al. ........................ | 528/405 |
| 1,137,005 | 4/1915 | Jacobson .............................. | 423/556 |
| 3,323,979 | 6/1967 | Foster et al. ......................... | 162/167 |
| 3,544,476 | 12/1970 | Aiba et al. ............................ | 252/175 |
| 3,738,945 | 6/1973 | Panzer et al. ........................ | 528/405 |
| 3,790,529 | 2/1974 | Fujimura et al. .................... | 525/157 |
| 3,798,160 | 3/1974 | Huffman .............................. | 210/710 |
| 3,859,212 | 1/1975 | Smalley et al. ...................... | 210/734 |
| 3,907,758 | 9/1975 | Sackmann et al. .................. | 162/168 |
| 3,988,277 | 10/1976 | Witschonke et al. ................ | 524/195 |
| 4,045,357 | 8/1977 | Reed ..................................... | 175/72 |
| 4,051,028 | 9/1977 | Fiessinger ............................ | 423/629 |
| 4,238,347 | 12/1980 | Gancy et al. ......................... | 252/175 |
| 4,251,410 | 2/1981 | Danner et al. ....................... | 524/512 |
| 4,655,934 | 4/1987 | Rose et al. ........................... | 252/181 |

FOREIGN PATENT DOCUMENTS

| | | | |
|---|---|---|---|
| 2630768 | 1/1977 | Fed. Rep. of Germany ...... | 423/462 |
| 1548620 | 7/1979 | United Kingdom . | |

*Primary Examiner*—Robert A. Wax
*Attorney, Agent, or Firm*—Brumbaugh, Graves, Donohue & Raymond

[57] ABSTRACT

Polyvinyl alcohol (PVA) can be effectively utilized as a floc conditioner during the formation of polyaluminum chloride. The polyvinyl alcohol can be effectively incorporated into the composition either before basification (pre-addition) or afterwards (post-addition). When added to concentrated aluminum containing solutions (8-9% $Al_2O_3$), polyvinyl alcohol is preferably used at concentrations up to about 2500 ppm. Higher concentrations may exhibit overdose behavior with progressively decreasing effectiveness. The preferred dosage is about 1750 ppm of PVA for synthetic laboratory water.

10 Claims, 8 Drawing Sheets

POLYVINYL ALCOHOL CONTAINING POLYALUMINUM CHLORIDE FLOCCULANTS

BACKGROUND OF THE INVENTION

This invention relates to an improved composition for water treatment in which polyvinyl alcohol is used in combination with a polyaluminum chloride as a flocculating and turbidity reducing agent.

It is known in the water treatment art to utilize polyaluminum salts such as polyaluminum chloride (PAC), polyaluminum sulfate (PAS) and polyaluminum chloride sulfate (PACS) as flocculating agents for the treatment of both potable and waste water. For example, U.S. Pat. No. 3,544,476 describes the use of a polyaluminum chloride as a coagulant.

Various methods are known for the production of these polyaluminum salts, which address problems of stability, seek to provide enhanced basicity or reduced sulfate, or strive to improve production yields or economics. As a general rule, however, each of these methods involves addition of a base to an aluminum salt solution to form hydroxylated aluminum species. Depending on the amount of base added, the initial product may be a polyaluminum salt or aluminum hydroxide. If aluminum hydroxide is formed first, the polyaluminum salt is then formed by the addition of additional aluminum salt to the aluminum hydroxide.

Regardless of the method of formation, these known polyaluminum salts are then added as flocculating agents to remove impurities from water. It is desirable to minimize the amount of material added, both from the standpoint of economics, i.e., minimizing the cost of water treatment, and from a health standpoint.

Accordingly, it is an object of the present invention to provide polyaluminum salt solutions which exhibit enhanced flocculating power such that lower concentrations of the polyaluminum salt can be employed.

SUMMARY OF THE INVENTION

It has now been found that polyvinyl alcohol (PVA) can be effectively utilized as a floc conditioner during the use of polyaluminum chloride as a coagulant. The polyvinyl alcohol can be effectively incorporated into the composition either before basification (pre-addition) or afterwards (post-addition). When added to concentrated aluminum containing solutions (8–9% Al$_2$O$_3$), polyvinyl alcohol is preferably used at concentrations up to about 2500 ppm. Higher concentrations may exhibit overdose behavior with progressively decreasing effectiveness. For laboratory synthetic water, the preferred dosage is about 1750 ppm of PVA.

Polyvinyl alcohol may also be advantageously used to enhance the performance of polymeric flocculating agents used with PAC. For example, the effectiveness of polyquaternaries such as CPS Chemical's Agefloc® A-50 (a dimethylamine/epichlorohydrin copolymer) or CPS Chemicals Agefloc® WT-40 used in conjunction with PAC can be dramatically enhanced.

DETAILED DESCRIPTION OF THE INVENTION

In accordance with the invention, polyvinyl alcohol has been shown to enhance the performance of polyaluminum chloride as a water treatment chemical. This enhancement will be described using the following examples.

Example 1

2500 grams of AlCl$_3$.6H$_2$O was combined with 2480 grams of distilled water. 538 grams of reagent grade Ca(OH)$_2$ was slowly added to this solution with vigorous agitation over a period of three to four hours. The resultant PAC solution was filtered and found to contain 9.8% Al$_2$O$_3$ and a basicity of 48.8%.

Examples 2-7

The procedure of Example 1 was repeated except that an amount of a 5% aqueous solution of polyvinyl alcohol (Vinol® 107) was added during the formation of the PAC solution according to the protocol in Table 1. In each example, except Example 4, the polyvinyl alcohol was added before addition of the calcium hydroxide.

Figure 1:
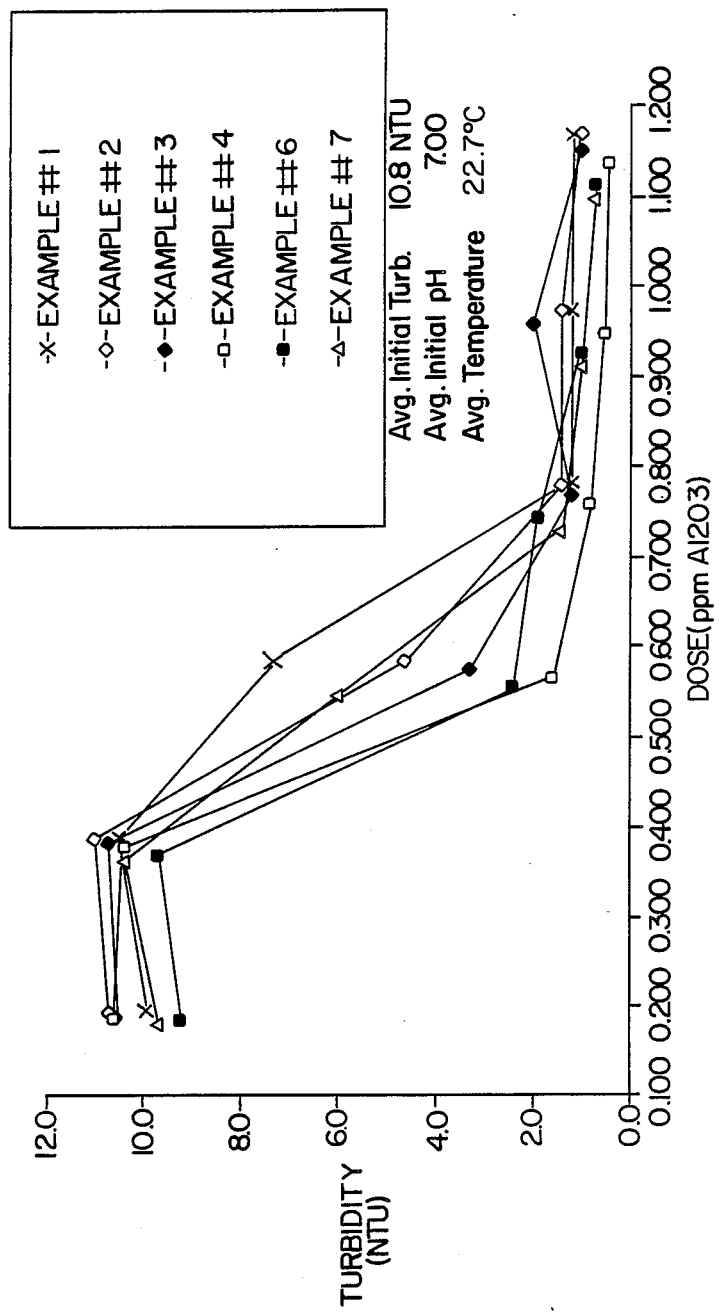
FIG. 1 graphically illustrates the effect of PVA on the coagulating effectiveness of PAC.

FIG. 1 illustrates the performance of PAC solutions prepared in Examples 1–4, 6 and 7 in reducing turbidity in a laboratory jar test. In each case, the presence of polyvinyl alcohol enhanced the performance of the solutions. It should be noted that some overdose behavior was observed at 3250 ppm polyvinyl alcohol.

Although not shown in FIG. 1, Example 5, in which 1750 ppm of polyvinyl alcohol was added before the base, it performed in essentially the same manner as Example 4.

TABLE 1

| Example | Vinol 107 (PPM) | Agefloc® A-50 (%) | Alumina (%) | Basicity (%) |
|---|---|---|---|---|
| 1 | 0 | 0 | 9.8 | 49 |
| 2 | 100 | 0 | 9.8 | 49 |
| 3 | 750 | 0 | 9.8 | 50 |
| 4 | 1750 (POST) | 0 | 9.6 | 48 |
| 5 | 1750 (PRE) | 0 | 9.5 | 49 |
| 6 | 2500 | 0 | 9.5 | 48 |
| 7 | 3250 | 0 | 9.1 | 48 |

Examples 8-29

The procedure of Examples 1 and 2–7 was repeated, except that varying amounts of a dimethylamine/epichlorohydrin copolymer (CPS Chemicals Agefloc® A-50) was added as a flocculating agent in accordance with the protocol in Table 2. Examples 8–12 were control runs containing no polyvinyl alcohol. As in Examples 2–7, both the polyvinyl alcohol and the Agefloc® A-50 were added after basification unless indicated otherwise in Table 2.

TABLE 2

| Example | Vinol 107 (PPM) | Agefloc ® A-50 (%) | Alumina (%) | Basicity (%) |
|---|---|---|---|---|
| 8 | 0 | 1 | 9.7 | 48 |
| 9 | 0 | 2 | 9.6 | 48 |
| 10 | 0 | 3 (PRE) | 9.5 | 48 |
| 11 | 0 | 3 | 9.5 | 48 |
| 12 | 0 | 5 | 9.3 | 48 |
| 13 | 1750 | 1 | 9.4 | 48 |
| 14 | 1500 | 1 | 9.2 | 48 |
| 15 | 3250 | 1 | 9.0 | 48 |
| 16 | 1750 | 2 | 9.2 | 48 |
| 17 | 2500 | 2 | 9.1 | 48 |
| 18 | 3250 | 2 | 8.9 | 48 |
| 19 | 100 | 3 | 9.5 | 47 |
| 20 | 1750 (PRE) | 3 (PRE) | 9.2 | 47 |
| 21 | 1750 (PRE) | 3 (POST) | 9.1 | 49 |
| 22 | 1750 (POST) | 3 (PRE) | 9.1 | 48 |
| 23 | 1750 (POST) | 3 (POST) | 9.2 | 48 |
| 24 | 2500 | 3 | 9.0 | 48 |
| 25 | 3250 | 3 | 8.8 | 48 |
| 26 | 100 | 5 | 9.3 | 48 |
| 27 | 1750 | 5 | 9.0 | 48 |
| 28 | 2500 | 5 | 8.8 | 48 |
| 29 | 3250 | 5 | 8.6 | 48 |

Figure 2:
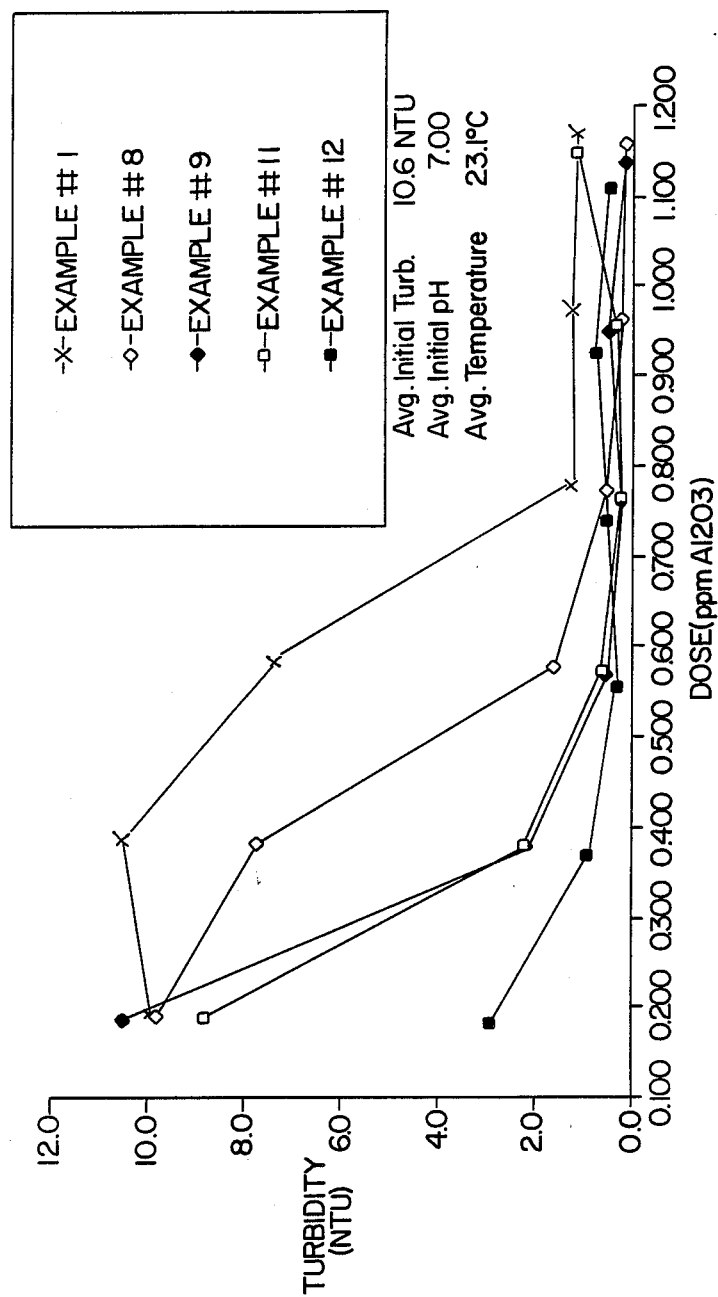
FIG. 2 graphically illustrates the effect of Agefloc® A-50 on the coagulating effectiveness of PAC.

FIG. 2 compares the flocculating power of PAC alone (Example 1) with PAC prepared using 1, 2, 3 and 5 percent Agefloc® A-50. As can be seen from the graph, improved performance is observed with increasing concentrations of flocculating agent. Although not shown in FIG. 2, it was also found from comparison of Examples 10 and 11 that no significant difference related from pre as opposed to post-addition.

Figure 3:
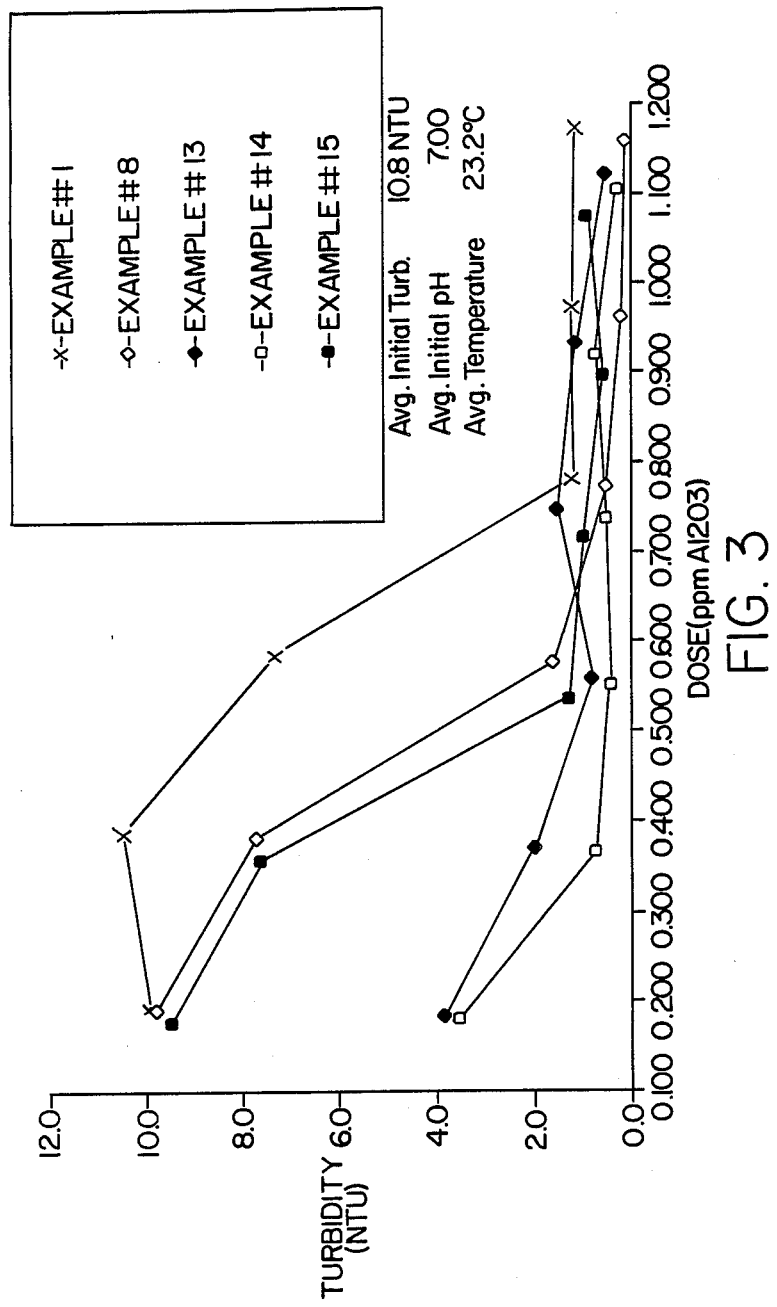
FIG. 3 graphically illustrates the effect of 1% Agefloc® A-50 with varying PVA concentrations.

FIG. 3 compares the flocculating power of PAC prepared with 1% Agefloc® A-50 and varying amounts of polyvinyl alcohol (Examples 13-15) with PAC alone (Example 1) and PAC with 1% Agefloc® A-50 (Example 8). As can be seen, substantial improvement in effectiveness results from use of Agefloc® A-50 in combination with 1750 to 2500 ppm polyvinyl alcohol, although higher levels of polyvinyl alcohol (3250 ppm) lead to reduced effectiveness, at least in the case of synthetic laboratory water. This effect is more than the additive effects of polyvinyl alcohol and Agefloc ® A-50 utilized separately.

Figure 4:
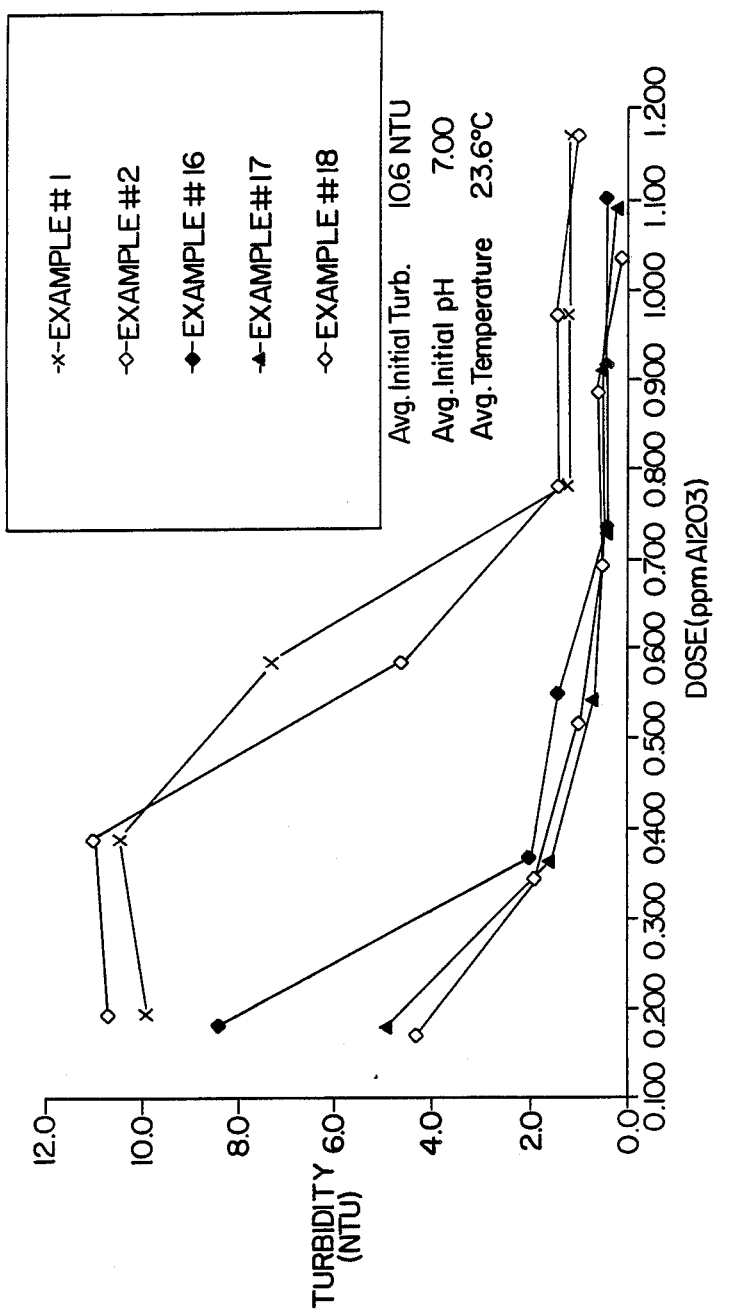
FIG. 4 graphically illustrates the effect of 2% Agefloc® A-50 with varying PVA concentrations.

FIG. 4 shows the same type of results using 2% Agefloc ® A-50. Again there is a substantial enhancement of flocculating power when Agefloc ® A-50 and polyvinyl alcohol are used in combination. At 2% Agefloc ® A-50, 3250 ppm polyvinyl alcohol does not appear to be an overdose (Example 18).

Figure 5:
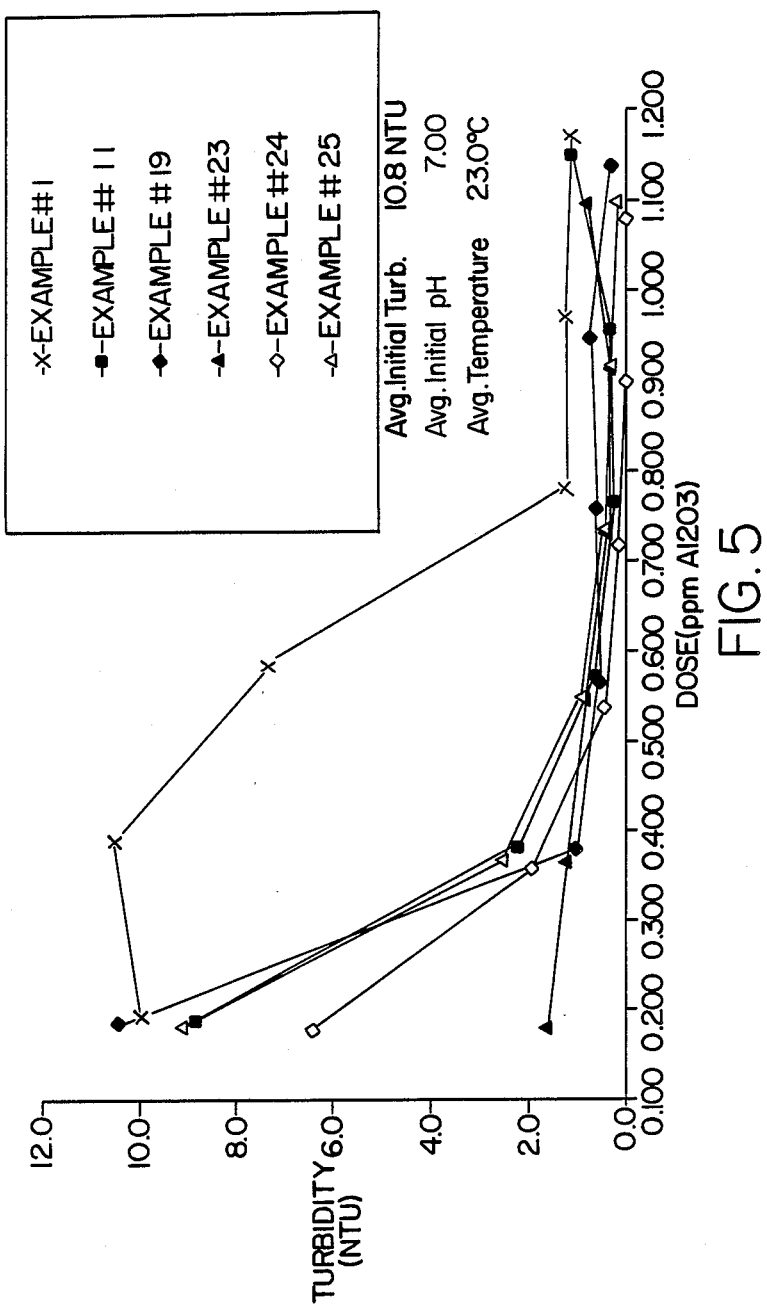
FIG. 5 graphically illustrates the effect of 3% Agefloc® A-50 with varying PVA concentrations.

FIG. 5 illustrates the affect of varying polyvinyl alcohol concentrations with 3% Agefloc ® A-50. These examples again showed enhancement of flocculating power, particularly with 1750 ppm polyvinyl alcohol. Overdose behavior was observed at higher polyvinyl alcohol concentrations.

Figure 6:
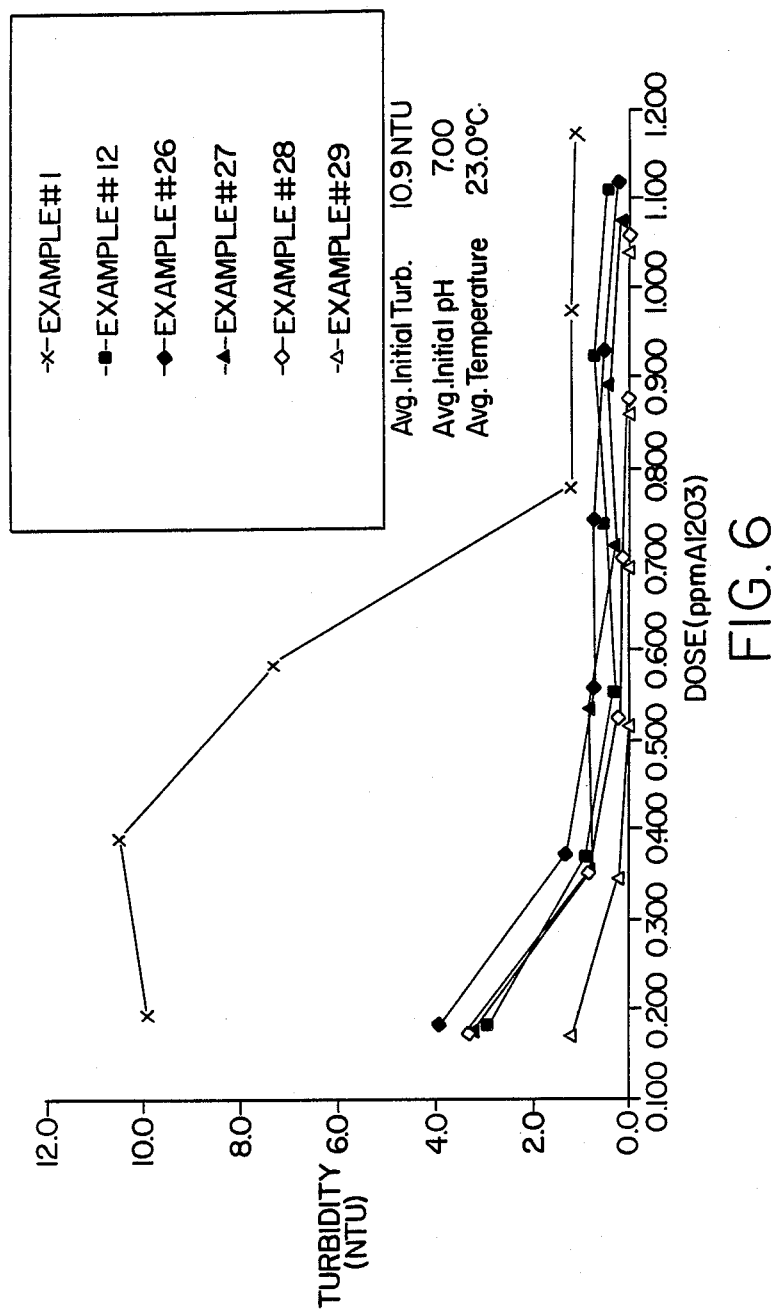
FIG. 6 graphically illustrates the effect of 5% Agefloc® A-50 with varying PVA concentrations.

FIG. 6 illustrates the effect of varying polyvinyl alcohol concentrations with 5% Agefloc ® A-50. The samples containing polyvinyl alcohol performed better that Agefloc ® A-50 alone at all concentrations tests, and no overdosing was observed.

Figure 7:
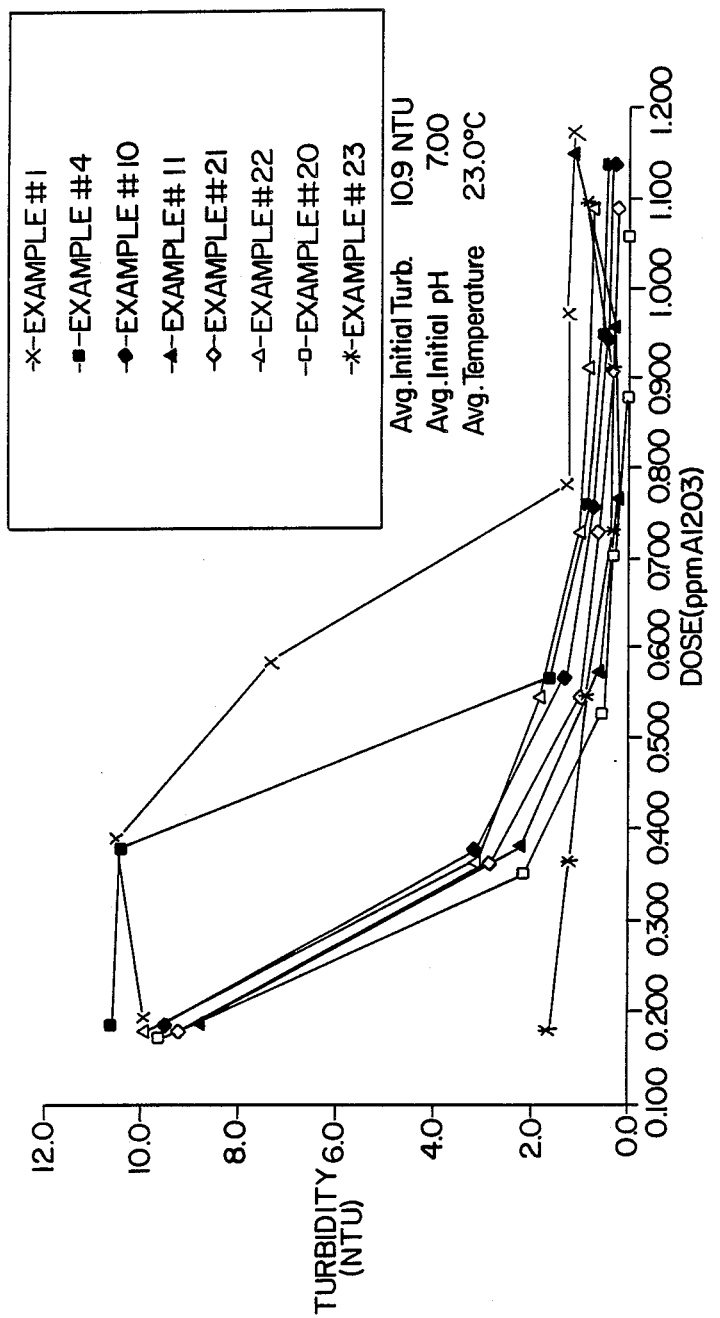
FIG. 7 graphically illustrates the effect of pre- and post-addition of 3% Agefloc® A-50 and PVA.

FIG. 7 illustrates the effect of pre-versus post-addition. Although all variations showed some improvement over Agefloc ® A-50 alone the best results were observed for post addition of both polyvinyl alcohol and Agefloc ® A-50 (Example 23).

Examples 30-31

Figure 8:
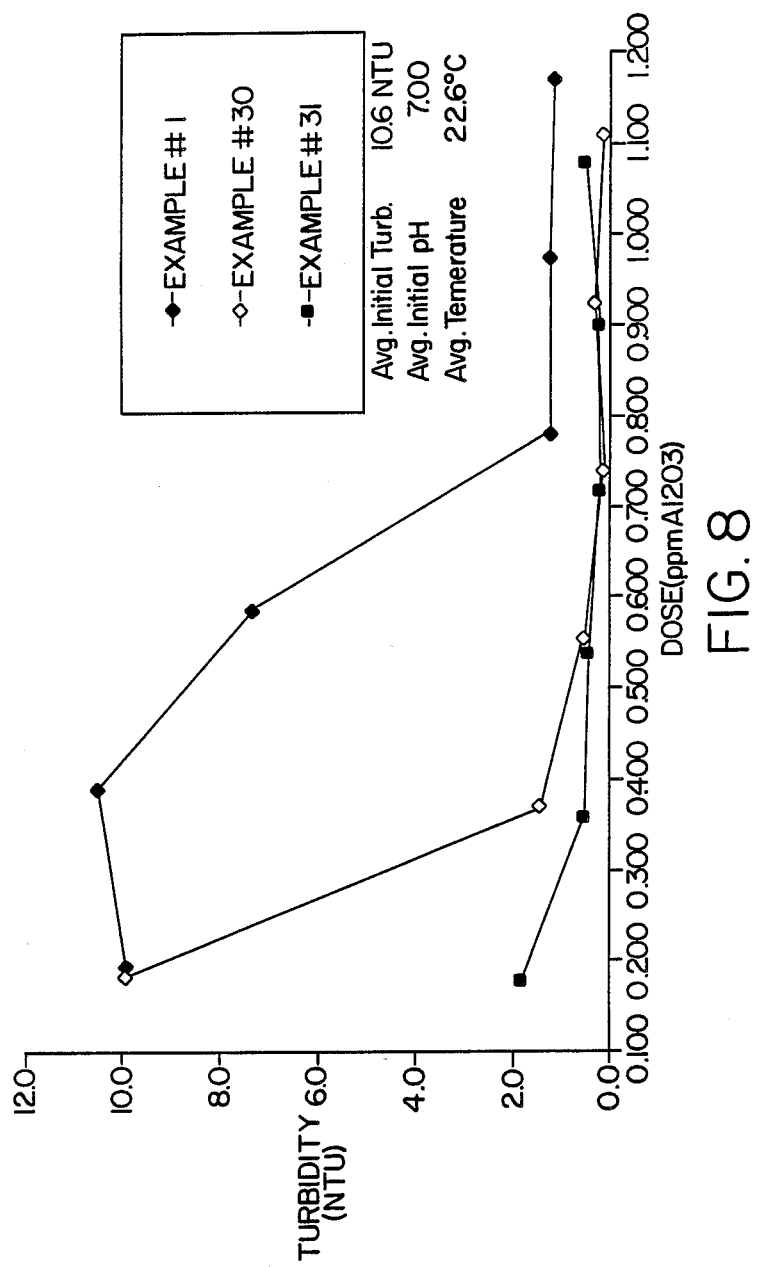
FIG. 8 graphically illustrates the effect of Agefloc® WT-40 with varying PVA concentrations.

The procedure of the preceding Examples was repeated, for two samples, one with no PVA and 5% Agefloc ® WT-40 (Example 30–9.3% aluminas, 48% basicity) and one with 1750 ppm PVA and 5% Agefloc ® WT-40 (Example 31–9.0% alumina 48% basicity). FIG. 8 illustrates the turbidity reduction observed using these two samples, and clearly shows the substantial superiority of the PVA/flocculant combination.

The above examples illustrate the effectiveness of polyvinyl alcohol either used alone or in combination with a known flocculating agent for enhancing the performance of polyaluminum chloride as a water treatment chemical. It will be understood, however, that variations in water at different locales may make the combination of polyvinyl alcohol with certain flocculating less effective or change the amounts of PVA and flocculating agent that is preferred.

I claim:

1. A water treatment composition consisting essentially of a flocculating component and water soluble polyvinyl alcohol, wherein the flocculating component comprises a polyaluminum salt and the polyvinyl alcohol is present in an amount effective to enhance floc formation.

2. A composition according to claim 1, wherein the polyaluminum salt is a polyaluminum chloride.

3. A composition according to claim 2, wherein polyvinyl alcohol is present in an amount ranging from about 100 ppm to about 2500 ppm.

4. A composition according to claim 2, wherein the polyaluminum chloride is formed by a process comprising neutralization of an aluminum species to form aluminum hydroxide followed by reaction of the aluminum hydroxide with aluminum chloride and the polyvinyl alcohol is introduced prior to the formation of the aluminum hydroxide.

5. A composition according to claim 1, wherein the flocculating component further comprises a polyquaternary flocculating agent.

6. A composition according to claim 5, wherein the polyquaternary flocculating agent is dimethylamine/epichlorohydrin copolymer.

7. In a method for the preparation of a water treatment composition comprising a polyaluminum salt comprising neutralizing a solution containing aluminum with a base, the improvement comprising,
   adding water soluble polyvinyl alcohol during the formation of the polyaluminum salt in an amount effective to act as a enhancer for floc formation.

8. A method according to claim 7, wherein the polyvinyl alcohol is added to a concentration of about 100 ppm to about 2500 ppm.

9. A method according to claim 7, wherein the polyvinyl alcohol is added to the solution prior to the addition of base.

10. A method according to claim 7, wherein the polyvinyl alcohol is added after the neutralization step.

* * * * *